FAST RELEASING MARKER FOR TELEPHONE SWITCHING SYSTEM

Filed July 5, 1963 3 Sheets-Sheet 1

INVENTORS
NIKOLAUS LEWEN
RUDOLF FAMBACH
BY
ATTORNEY

FAST RELEASING MARKER FOR TELEPHONE SWITCHING SYSTEM

Filed July 5, 1963 3 Sheets-Sheet 2

INVENTORS
NIKOLAUS LEWEN
RUDOLF FAMBACH
BY [signature]
ATTORNEY

FAST RELEASING MARKER FOR TELEPHONE SWITCHING SYSTEM

Filed July 5, 1963 3 Sheets-Sheet 3

INVENTORS
NIKOLAUS LEWEN
RUDOLF FAMBACH
BY [signature]
ATTORNEY

United States Patent Office 3,309,466
Patented Mar. 14, 1967

3,309,466

FAST RELEASING MARKER FOR TELEPHONE SWITCHING SYSTEM

Rudolf Fambach, Freiburg, and Nikolaus Lewen, Tamm, Kreis Ludwigsburg, Germany, assignors to International Standard Electric Corporation, New York, N.Y., a corporation of Delaware Filed July 5, 1963, Ser. No. 297,993
Claims priority, application Germany, July 21, 1962, St 19,506
3 Claims. (Cl. 179—18)

This invention relates to crosspoint type telephone switching systems and more particularly to testing arrangements for controlling crosspoint operations in such systems.

The described system comprises two cascaded stages of crosspoint matrices, the first stage being called an "input matrix" and the second stage being called an "output matrix." Each matrix includes rows and columns of multiples arranged in intersecting relation. The external circuits, which are to be interconnected via the two stages, are connected to input terminals of the input matrix and the output terminals of the output matrix respectively. The output of the input matrix cross-connects directly to the input of the output matrix. These cross-connections are made in a pattern which enables every input to reach any desired output.

The system which controls switching within the two-stage matrices makes use of markers, registers, and translators—each of these terms being used to refer to well known telephone devices. Either a central or a plurality of markers may be used depending upon system needs. If a plurality of markers are used, each may be given access to or control over a separate matrix. For the purpose of controlling the establishment of connections, the markers are coupled to receive data from the registers and translators. In addition, the marker carries out a number of tests to be certain that these connections are properly established. For example, if the output side of the two stages connect to repeaters, the marker checks to determine whether the repeaters are busy or idle and whether connections are released or double connections are made.

An object of the present invention is to provide an arrangement which uses either one central marker for small systems or a pair of markers for larger systems. This implies that the time available for the marker to handle calls must be kept as short as possible. If necessary, this time may be extended due to the functional combination of the marker and a central translator.

According to one aspect of the invention, this is accomplished by a test arrangement for a two-stage crosspoint arrangement extending to several switching grids. Immediately after a high-speed test is carried out by the marker, and the identification of a connecting path is known, the marker is released. The time consuming subsequent testing process is performed by subsequent circuit elements, each associated with one switching grid.

Further features of the invention may be taken from the following explanation of the invention given with reference to an example of embodiment shown in FIGS. 1–5 of the accompanying drawings, in which.

Figure 1:
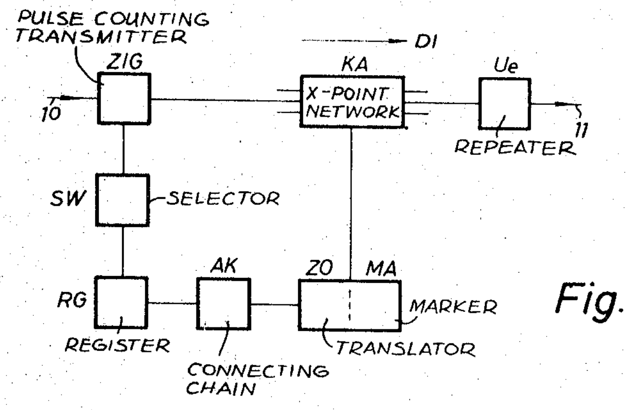
FIG. 1 is a block diagram which shows part of a telephone switching circuit in which there are two stages of crosspoints arranged as a direction selecting stage.
Figure 2:
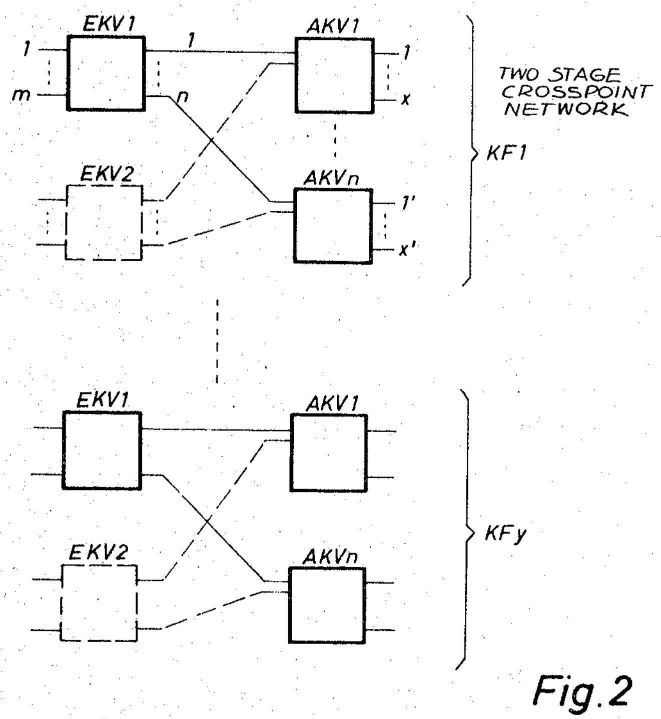
FIG. 2 shows the design of a crosspoint network for use in FIG. 1.
Figure 3:
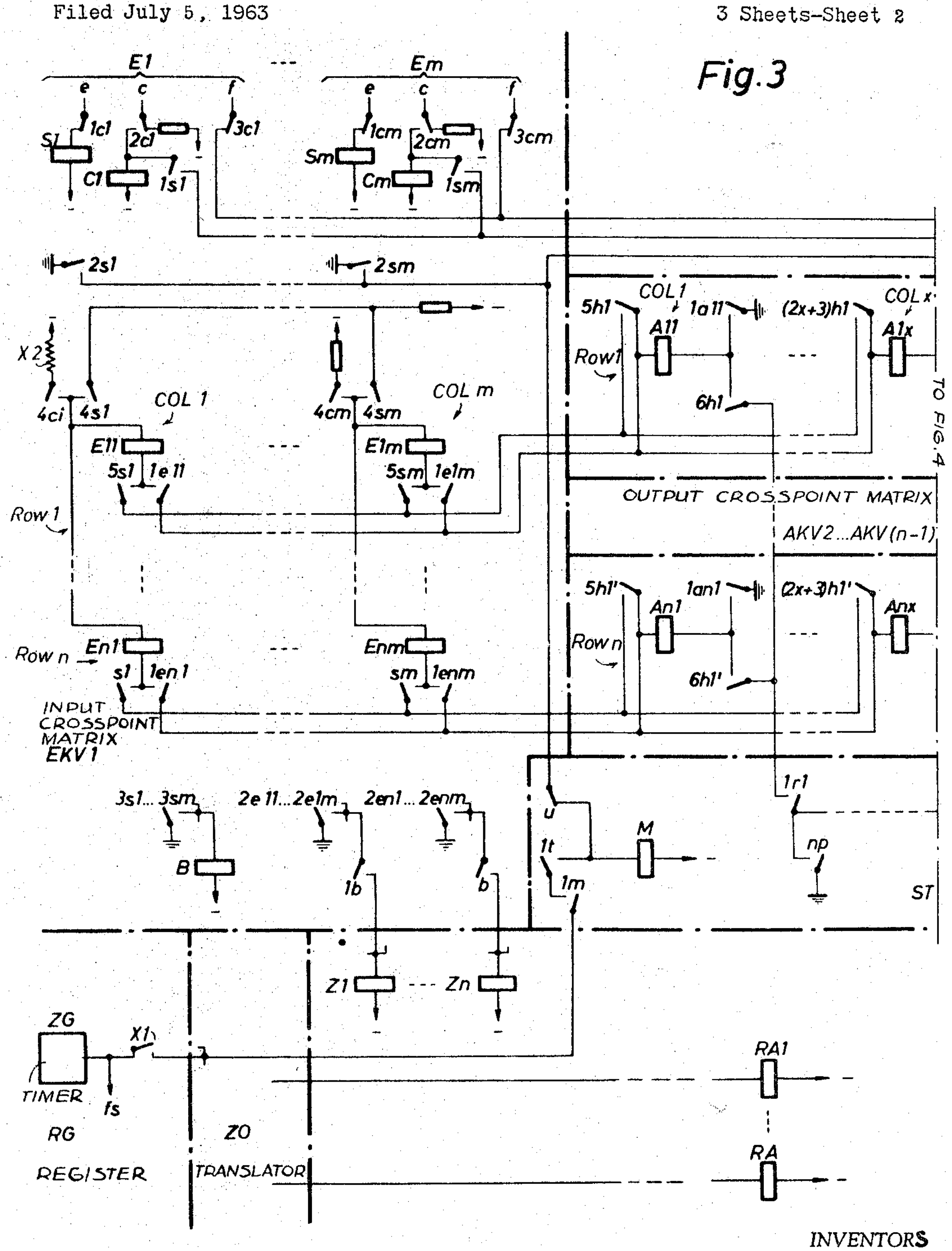
Figure 4:
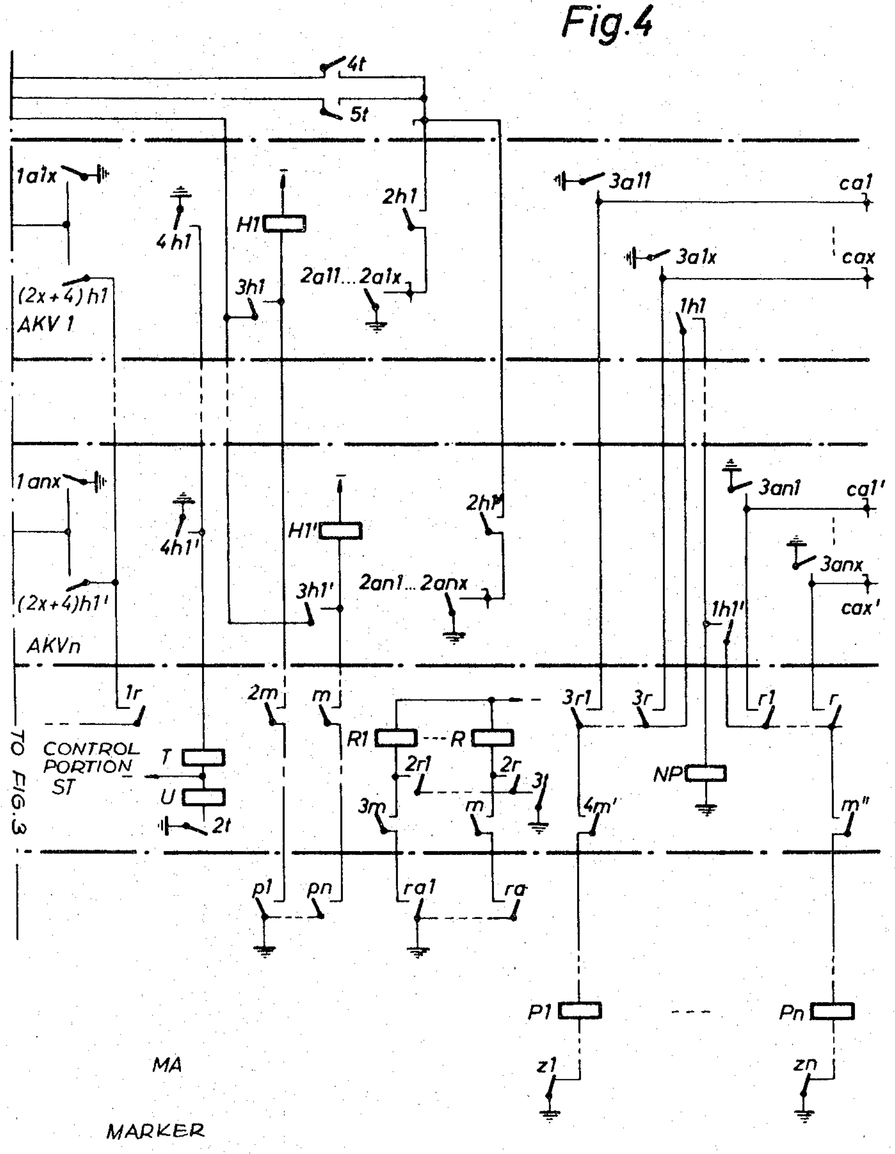
Figure 5:
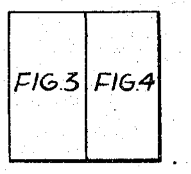

FIGS. 3 and 4 are schematic circuits which show details of the switching equipment used in FIGS. 1 and 2; and FIG. 5 shows how FIGS. 3 and 4 should be joined to provide a complete circuit diagram.

FIG. 1 shows an exemplary portion of a telephone system which might incorporate the principles of the invention. This system comprises means for extending calls from an incoming line 10 to an outgoing line 11. The function of the system is to select a specific one, from among many, outgoing lines responsive to digital information received over incoming line 10.

The major divisions of the circuit shown in FIG. 1 are: A pulse counter ZIG, a selector SW, a register RG, a connecting chain AK, a translator ZO, a marker MA, a crosspoint switching network KA, and a repeater 11. In the part of a telephone switching system shown in FIG. 1, an idle register RG is connected after seizure of a pulse counting transmitter ZIG for receiving (via a hunting selector SW) the code numbers transmitted by a calling subscriber. After having stored these code numbers, the register RG is connected via a connecting chain AK, to a central translator ZO and marker MA. Next, the code numbers stored by the register RG are transferred in any suitable form to the central marker MA. Also upon seizure of the marker MA, a signal is sent to the pulse counting transmitter ZIG which seizes the two-stage crosspoint network KA. This causes one switching matrix or grid of the crosspoint network KA to be connected to an input of the marker MA. The marker MA, thereupon transmits signals to the crosspoint network KA and thus enables the crosspoint network KA to seize a repeater U*e*.

FIG. 2 schematically shows the two-stage crosspoint network KA more in detail. This network includes a number of switching stages KF1 . . . KF*y*. Each switching stage KF comprises one or more input crosspoint matrices EKV1, EKV2, etc. Each matrix has *m* number of input leads and *n* number of output leads. There are *n* number of output crosspoint matrices AKV1 . . . AKV*n*, each having a number of input leads extending to the input crosspoint matrices. Each of the output matrices AKV1 . . . AKV*n* has *x* number of output leads. The output leads of the input crosspoint matrices, and the input leads of the output crosspoint matrices are connected to one another with the aid of intermediate leads.

For reasons of clarity, the arrangement according to FIGS. 3, 4 shows the input crosspoint matrices EKV1 and the output crosspoint matrix AKV1 and AKV*n* of one switching stage. The matrix EKV1 is here shown as having four exemplary multiples arranged in two columns (COL1, COL*m*) and two rows (ROW1, ROW*n*) to provide intersections having crosspoints, as at E11, for example. In like manner, the matrix AKV comprises two columns (COL1 and COL*x*) and two rows (ROW1 and ROW*n*). Of course any suitable numbers of multiples may be provided in either matrix. FIGS. 3, 4 show a control portion ST associated with this particular switching stage, as well as parts of the central marker MA, the translator ZO, and of the register RG. The network of talking wires has been omitted; however, it should be understood that such wires extend through contacts (not shown) on the crosspoint relays E and A. Thus, contacts on the relay E11, for example, constitutes one crosspoint for selectively coupling horizontal and vertical talking wires.

Each crosspoint in the input crosspoint matrix EKV1 is associated with one crosspoint relay E. In the output matrix AKV, each crosspoint is associated with one crosspoint relay A. Point E1 is the first of the *m* inputs to the input crosspoint matrix EKV1. Point E*m* is the last input. Each of these inputs includes, among other things, one seizing wire *c* and two control wires *e* and *f*.

Upon seizure of the input point E1, for example, an input-marking relay S1 is energized via the control wire *e*. When relay S1 operates, the crosspoint relays E11 to E*n*1 lying in the first column, COL1, are marked with a negative potential via the contact 4*s*1. The contacts 5*s*1 . . . *s*1 select the row and, thus, the intermediate lines extending to the output crosspoint matrix. A marker-connecting relay M is energized via the contact 2*s*1 and the closed contact *u*. Lying within the control device ST, relay M connects (with the aid of its contacts 2*m* . . . *m*) the auxiliary relays H1 . . . H1' to the marker MA. These relays are associated with one input of the output crosspoint matrix AKV. Also, at its contacts 3*m* . . . *m*', relay M connects the direction indicating relays R1 . . . R also to the marker MA. These relays are also arranged within the control device ST. At its contacts 4*m* . . . *m*', relay M connects the wires which may be connected to the test output leads *ca*1 . . . *cax*, and *ca*1' . . . *cax*' to the marker MA.

Under the assumption that the establishment of a connection is requested in the direction D1 (FIG. 1), the relay RA1 (FIG. 3) is supposed to have been energized. This relay is one of the direction receiving relays RA1 . . . R*a* within the marker MA. Consequently, in the control device ST, the direction relay R1 is energized, via the contacts, *ra*1, 3*m*. With its contacts 3*r*1 . . . *r*1, relay R1 connects through all of test output leads (*ca*1 . . . *ca*1' extending in the direction 1) to a high-speed testing and selecting device of any known design. Here, this device comprises high-speed testing relays P1 . . . P*n*. If the test output lead *ca*1 (as applied to the high-speed testing relay P1) is free or idle, the high-speed testing relay P1 operates. By the action of the contact *p*1, the auxiliary relay H1 is energized via the closed contact 2*m*. Relay H1' energized via the contacts 3*h*1' and 2*s*1 is locked.

When the auxiliary relay H1 operates, the following processes occur:

(1) By the action of the contact 4*h*1, a circuit is completed for operating a relay T. With the action of its contacts 3*t*, a holding circuit is completed via the contact 2*r*1 for the direction relay R1. The action of contacts 1*t* prepares a hold circuit for the marker connecting relay M which extends to the register RG. Relay T also energizes a relay U by the action of its contact 2*t*.

(2) Relay H1, at its contacts 5*h*1 and 6*h*1, prepare a circuit for the crosspoint relay A11.

(3) By the action of contacts 1*h*1, a subsequent testing relay NP is connected via the closed contact 3*r*1 to the test output lead *ca*1.

In keeping with this aspect of the invention, all steps have been taken for effecting a subsequent testing which is independent of the marker. Thus, the marker may conduct a high-speed test and then drop out of this particular connection preparatory to serving another call. The equipment ST which remains in association with the call, may then conduct any number of subsequent tests.

The connecting together of the register RG, the translator ZO or the marker MA and the switching network may now be eliminated. To do this, relay U operates. When contacts *u* open, a ground is removed from the left-hand side of the relay M winding, and a negative potential is effectively applied as a release signal via the marker connecting relay M, the contacts 1*t*, 1*m* and *x*1 to the register RG. Responsive thereto, a timing circuit ZG measures a period of time and a releasing wire *fs* is energized to disconnect the register RG from the translator ZO. When the translator ZO releases the signal wire is interrupted, as at contacts *x*1, for example, and the marker connecting relay M is released. Subsequently to the de-energization of the marker connecting relay M, both the translator ZO and the marker MA are ready to establish a new connection with another switching network.

In dependence upon the potential condition of the test wire *ca*1, the subsequent testing relay NP is energized after a certain time delay which, in conventional types of repeaters, may amount from about 20 to 30 milliseconds, but may also assume higher values. The selected crosspoint relays E11 and A11 are thus energized over the following circuit:

Ground, contacts *np* (in device ST), contacts 1*r*1, 6*h*1, relay winding A11, contacts 5*h*1, 5*s*1, relay winding E11, contacts 4*s*1, and resistor X2 to negative battery.

After the crosspoints operate and the contact 2*a*11 close, the register RG is signalled. That is, ground is extended via the contacts 2*a*11, 2*h*1, 4*t*, 3*c*1, whereupon the ground potential is applied to the control wire *f* of the input point E1. Thus, the completion of the connecting through process is indicated to the register RG (via the pulse counting transmitter ZIG, FIG. 1). Responsive thereto, the timing circuit ZG is put out of operation. At the same time, and with the aid of the same contact 2*a*11, a circuit is completed via the contacts 2*h*1, 5*t*, and 1*s*1, for operating a seizure relay C1 associated with the input E1. This relay C1 operates and completes a holding circuit via the contact 2*c*1 and the seizing wire *c*. The seizing relay C1, moreover, disconnects the input marking relay S1 by the action of its contact 1*c*1. After release of this relay S1, the auxiliary relay H1 and, consequently the relays T, U, R1 and NP, are returned to normal. The release of the relay U causes the switching network (which was up to now held in a blocked condition) to be released for effecting the next connection.

The crosspoint relays E11 and A11 are held over the following circuit:

Ground, contacts 1*a*1, the winding A11, contacts 1*e*11, winding E11, contacts 4*c*1, resistor X2 to negative battery.

By connecting through the crosspoints, the repeater U*e* (FIG. 1) is marked in the busy condition by the ground potential applied to the test wire *ca*1 from the contact 3*a*11.

However, if the subsequent testing relay NP is not energized, the crosspoint will not be connected through nor will the return indication of the connecting through process be sent to the register RG (via the control wire *f*). After the lapse of the predetermined period of time, the timing circuit ZG in the register RG releases the path which has been established up to this point. This also causes the register RG to be released.

In cases where another input (say E*m*) of the input crosspoint matrix EKV1 is marked during the establishment of a different connection, the intermediate line via which the above mentioned connection had been completed, is marked busy in the following way: Upon energization of an input-marking relay S, a relay B is energized by one of the contacts 3*s*1 . . . 3*sm*. With this, relay B operates its contacts 1*b* . . . *b* to prepare circuits for the blocking relays Z1 . . . Z*n* arranged within the marker MA. The contacts of the crosspoint relays lying in one row, of the input matrix EKV1 control these blocking relays. In the present case, the circuit for the blocking relay Z1 is completed by the action of the contacts 2*e*11, because the crosspoint relay E11 is assumed to be busy. One contact *z*1 of the blocking relay Z1 interrupts the operating circuit for the high-speed test relay P1 which is thus no longer capable of responding.

While we have described our invention in conjunction with specific apparatus, it is to be clearly understood that this description is made only by way of example and not as a limitation on the scope of the invention.

What is claimed is:

1. A testing circuit for a two-stage cascaded array of crosspoint switching matrices, means comprising a marker and a common control circuit for operating said matrices, means comprising said marker circuit for selecting a path through said matrices, means in said marker responsive to said selection of said path for performing a high-speed test to identify said path and determine whether said path is busy or idle, means for immediately releasing said marker after said test, and means responsive to said high speed test comprising said common control circuit for thereafter conducting a low-speed test of said path to complete ensuing switching functions.

2. The circuit of claim 1 and means responsive to a ready to release said marker condition for measuring a period of time, means responsive to said time measuring means for causing said immediate release of said marker, and means responsive to the termination of said measured time period for releasing said path if a connection has not then been completed.

3. The circuit of claim 1 wherein said high speed test is conducted at end of said cascade, and means responsive to a seizure of an input at one end of said cascaded matrices for suppressing said high-speed test at the other end of said cascaded matrices, and means whereby said last named means is controlled in joint dependence upon the busy or idle conditions at said one end of said cascade of an input and upon the availability of other output at the other end of said cascade.

References Cited by the Examiner

UNITED STATES PATENTS

| | | | |
|---|---|---|---|
| 2,694,752 | 11/1954 | Wright et al. | 179—18 |
| 2,999,131 | 9/1961 | Edstrom | 179—18.7 |
| 3,129,407 | 4/1964 | Paull | 179—18.7 X |

KATHLEEN H. CLAFFY, *Primary Examiner.*

L. A. WRIGHT, *Assistant Examiner.*